(12) United States Patent
Tang et al.

(10) Patent No.: US 11,327,971 B2
(45) Date of Patent: May 10, 2022

(54) ASSERTION-BASED QUESTION ANSWERING

(71) Applicant: Microsoft Technology Licensing, LLC, Redmond, WA (US)

(72) Inventors: Duyu Tang, Redmond, WA (US); Nan Duan, Redmond, WA (US); Ming Zhou, Beijing (CN); Wendi Wang, Redmond, WA (US); Daxin Jiang, Beijing (CN); Shujie Liu, Beijing (CN); Linjun Shou, Beijing (CN); Ming Gong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/766,088

(22) PCT Filed: Dec. 6, 2018

(86) PCT No.: PCT/US2018/064150
§ 371 (c)(1),
(2) Date: May 21, 2020

(87) PCT Pub. No.: WO2019/118257
PCT Pub. Date: Jun. 20, 2019

(65) Prior Publication Data
US 2020/0356556 A1 Nov. 12, 2020

(30) Foreign Application Priority Data

Dec. 15, 2017 (CN) .......................... 201711354191.1

(51) Int. Cl.
*G06F 16/2455* (2019.01)
*G06F 16/248* (2019.01)

(52) U.S. Cl.
CPC ........ *G06F 16/2455* (2019.01); *G06F 16/248* (2019.01)

(58) Field of Classification Search
CPC .......................... G06F 16/2455; G06F 16/248
(Continued)

(56) References Cited

U.S. PATENT DOCUMENTS

| 6,801,665 | B1 * | 10/2004 | Atsumi | .................. | H04N 19/70 |
| | | | | | 375/E7.056 |
| 7,725,310 | B2 * | 5/2010 | Den Brinker | ......... | G10L 19/032 |
| | | | | | 704/219 |

(Continued)

OTHER PUBLICATIONS

Bahdanau et al., "Neural Machine Translation by Jointly Learning to Align and Translate", In repository of arXiv, arXiv:1409.0473, Sep. 1, 2014, pp. 1-15.

(Continued)

*Primary Examiner* — Hanh B Thai
(74) *Attorney, Agent, or Firm* — Schwegman Lundberg & Woessner, P.A.

(57) ABSTRACT

In embodiments of the present disclosure, there is provided an assertion-based question answering manner. After a question and the related passage are obtained, an assertion answer to the question is determined based on content of the passage, and the assertion answer has a predetermined structure and represents a complete semantic meaning. Then, the assertion answer to the question may be outputted to the user. In the embodiments of the present disclosure, the question and the relevant passage are used as input, and a semi-structured assertion answer is output. The assertion answer according to embodiments of the present disclosure can provide richer semantic content than the traditional short answer, and provide a more concise expression than the traditional long answer, thereby ensuring accuracy of the answer while improving the user experience.

13 Claims, 6 Drawing Sheets

(58) Field of Classification Search
USPC .......................................................... 707/769
See application file for complete search history.

(56) References Cited

U.S. PATENT DOCUMENTS

| | | | |
|---|---|---|---|
| 9,081,814 B1 | 7/2015 | Carroll et al. | |
| 10,362,337 B2* | 7/2019 | Mertens | H04N 19/16 |
| 10,769,552 B2* | 9/2020 | Beamon | G06F 16/61 |
| 2005/0025371 A1* | 2/2005 | Atsumi | H04N 19/17 |
| | | | 382/239 |
| 2006/0041431 A1* | 2/2006 | Maes | H04L 65/607 |
| | | | 704/270.1 |
| 2006/0088098 A1* | 4/2006 | Vehvilainen | H04N 19/46 |
| | | | 375/240.03 |
| 2007/0100639 A1* | 5/2007 | Den Brinker | G10L 19/032 |
| | | | 704/500 |
| 2007/0237409 A1* | 10/2007 | Atsumi | H04N 19/167 |
| | | | 382/239 |
| 2011/0258230 A1 | 10/2011 | Jung et al. | |
| 2013/0006641 A1* | 1/2013 | Brown | G06F 16/3329 |
| | | | 704/270.1 |
| 2014/0108321 A1* | 4/2014 | Buchanan | G06N 5/02 |
| | | | 706/50 |
| 2014/0297571 A1* | 10/2014 | Beamon | G06F 16/313 |
| | | | 706/12 |
| 2014/0298199 A1* | 10/2014 | Johnson, Jr | H04L 65/403 |
| | | | 715/753 |
| 2014/0358890 A1 | 12/2014 | Chen et al. | |
| 2015/0161242 A1* | 6/2015 | Visotski | G06F 16/3344 |
| | | | 707/730 |
| 2015/0332681 A1* | 11/2015 | Kim | H04S 3/02 |
| | | | 381/17 |
| 2016/0035060 A1* | 2/2016 | Lahmi | G06T 1/0028 |
| | | | 382/100 |
| 2016/0055155 A1* | 2/2016 | Allen | G06F 16/3331 |
| | | | 707/749 |
| 2016/0180438 A1* | 6/2016 | Boston | G06Q 30/0282 |
| | | | 705/26.7 |
| 2016/0292153 A1* | 10/2016 | Agarwalla | G06F 16/2455 |
| 2017/0140304 A1* | 5/2017 | Beamon | G06F 16/61 |
| 2017/0180759 A1* | 6/2017 | Mertens | H04N 19/70 |
| 2017/0351677 A1* | 12/2017 | Chaubal | G06F 16/24578 |
| 2019/0378021 A1* | 12/2019 | Buchanan | G06N 5/02 |
| 2020/0356729 A1* | 11/2020 | Duan | G06F 40/177 |

OTHER PUBLICATIONS

Bajaj et al., "Ms Marco: A Human Generated Machine Reading Comprehension Dataset", In the Proceedings of 30th Conference on Neural Information Processing Systems, Dec. 9, 2016, 11 Pages.

Bao et al., "Knowledge-based Question Answering as Machine Translation", In Proceedings of the 52nd Annual Meeting of the Association for Computational Linguistics, Jun. 2014, pp. 967-976.

Berant et al., "Semantic Parsing on Freebase from Question-Answer Pairs", In Proceedings of Conference on Empirical Methods in Natural Language Processing, vol. 2, Issue 6, Oct. 18, 2013, pp. 1533-1544.

Brown et al., "The Mathematics of Statistical Machine Translation: Parameter Estimation", In Computational Linguistics, vol. 19, Issue 2, Jun. 1993, pp. 263-311.

Burges, Christopher j. , "From Ranknetto Lambdarank to Lambdamart: An Overview", In Microsoft Research Technical Report MSR-TR-2010-82, Jun. 23, 2010, 19 Pages.

Cho et al., "Learning Phrase Representations using RNN Encoder-Decoder for Statistical Machine Translation", In Proceedings of the Conference on Empirical Methods in Natural Language Processing, Oct. 25, 2014, pp. 1724-1734.

Corro et al., "ClausIE: Clause-Based Open Information Extractio-", In Proceedings of the 22nd international Conference on World Wide Web, May 2013, pp. 355-366.

Duan, et al., "Question Generation for Question Answering", In Proceedings of the Conference on Empirical Methods in Natural Language Processing, Sep. 2017, pp. 877-885.

Fader et al., "Identifying Relations for Open Information Extraction", In Proceedings of the Conference on Empirical Methods in Natural Language Processing, Jul. 27, 2011, pp. 1535-1545.

Fader et al., "Open Question Answering over Curated and Extracted Knowledge Bases", In Proceedings of the 20th ACM SIGKDD International Conference on Knowledge Discovery and Data Mining, pp. 1156-1165.

Fader et al., "Paraphrase-Driven Learning for Open Question Answering", In Proceedings of The 51st Annual Meeting of the Association for Computational Linguistics, vol. 1, Aug. 2013, pp. 1608-1618.

Ishiwatari et al., "Chunk-based Decoder for Neural Machine Translation", Proceedings of the 55th Annual Meeting of the Association for Computational Linguistics, Jul. 2017, pp. 1901-1912.

Khashabi et al., "Question Answering via Integer Programming over Semi-Structured Knowledge", In Proceedings of the Twenty-Fifth International Joint Conference on Artificial Intelligence, Jul. 2016, pp. 1145-1152.

Khot et al., "Answering Complex Questions Using Open Information Extraction ", In Proceedings of the 55th Annual Meeting of the Association for Computational Linguistics, Jan. 2017, pp. 311-316.

Koehn et al., "Statistical Phrase-Based Translation", In Proceedings of the Conference of the North American Chapter of the Association for Computational Linguistics on Human Language Technology—vol. 1, May 27, 2003, pp. 48-54.

Manning et al., "An Introduction to Information Retrieval", In Publication of Cambridge University Press, Jul. 12, 2008, 581 Pages.

Miao et al., "Neural Variational Inference for Text Processing", In Proceedings of the 33rd International Conference on Machine Learning, Jun. 11, 2016, 10 Pages.

Och et al., "A Systematic Comparison of Various Statistical Alignment Models", In Proceedings of Computational Linguistics, vol. 29, Mar. 1, 2003, pp. 19-51.

Papineni et al., "BLEU: A Method for Automatic Evaluation of Machine Translation", In Proceedings of 40th Annual Meeting on Association for Computational Linguistics, Jul. 6, 2002, pp. 311-318.

Rajpurkar et al., "SQuAD: 100,000+ Questions for Machine Comprehension of Text", In Proceedings of the 2016 Conference on Empirical Methods in Natural Language Processing, Nov. 1, 2016, pp. 2383-2392.

Schmitz et al., "Open Language Learning for Information Extraction", In Proceedings of the Joint Conference on Empirical Methods in Natural Language Processing and Computational Natural Language Learning, Jul. 12, 2012, pp. 523-534.

Severyn et al., "Learning to Rank Short Text Pairs with Convolutional Deep Neural Networks", In the Proceedings of the 38th International ACM SIGIR Conference on Research and Development in Information Retrieval, Aug. 9, 2015, pp. 373-382.

Shen et al., "A Latent Semantic Model with Convolutional-Pooling Structure for Information Retrieval", In Proceedings of the 23rd ACM International Conference on Conference on Information and Knowledge Management, Nov. 3, 2014, pp. 101-110.

Sukhbaatar et al., "End-To-End Memory Networks", In Journal of Advances in Neural Information Processing Systems, Dec. 7, 2015, pp. 2431-2439.

Sutskever et al., "Sequence to sequence learning with neural networks", In Proceedings of Annual Conference on Neural Information Processing Systems, Dec. 8, 2014, pp. 3104-3112.

Tang et al., "Question Answering and Question Generation as Dual Tasks", In Computer Repository of https://arxiv.org/pdf/1706.02027.pdf, Jun. 2017, 9 Pages.

Tu et al., "Modeling Coverage for Neural Machine Translation", In Proceedings of the 54th Annual Meeting of the Association for Computational Linguistics, Aug. 2016, pp. 76-85.

Tymoshenko et al., "Convolutional Neural Networks vs. Convolution Kernels: Feature Engineering for Answer Sentence Reranking", In Proceedings of the Conference of the North American Chapter of the Association for Computational Linguistics: Human Language Technologies, Jun. 12-17, 2016, pp. 1268-1278.

(56) References Cited

OTHER PUBLICATIONS

Wang et al., "A Hybrid Framework for Text Modeling with Convolutional RNN", In Proceedings of the 23rd ACM SIGKDD International Conference on Knowledge Discovery and Data Mining, Aug. 13, 2017, pp. 2061-2069.

Wang et al., "Inner Attention based Recurrent Neural Networks for Answer Selection", In Proceedings of the 54th Annual Meeting of the Association for Computational Linguistics, Aug. 2016, pp. 1288-1297.

Wang, et al., "A Long Short-Term Memory Model for Answer Sentence Selection in Question Answering", In Proceedings of the 53rd Annual Meeting of the Association for Computational Linguistics and the 7th International Joint Conference on Natural Language Processing, Jul. 26-31, 2015, pp. 707-712.

Yang et al., "WIKIQA: A Challenge Dataset for Open-Domain Question Answering", In Proceedings of the Conference on Empirical Methods in Natural Language Processing, Sep. 17, 2015, pp. 2013-2018.

Yates et al., "TextRunner: Open Information Extraction on the Web", In Proceedings of Human Language Technologies: The Annual Conference of the North American Chapter of the Association for Computational Linguistics: Demonstrations, Apr. 2007, pp. 25-26.

Yih et al., "Question Answering Using Enhanced Lexical Semantic Models", In Proceedings of The 51st Annual Meeting of the Association for Computational Linguistics, vol. 1, Aug. 2013, pp. 1744-1753.

Yih et al., "Semantic Parsing via Staged Query Graph Generation: Question Answering with Knowledge Base", In Proceedings of 53rd Annual Meeting of the Association for Computational Linguistics and 7th International Joint Conference on Natural Language Processing, Jul. 28, 2015, pp. 1321-1331.

Yin et al., "Abcnn: Attention-based Convolutional Neural Network for Modeling Sentence Pairs", In Transactions of the Association for Computational Linguistics, vol. 4,, Dec. 2015, pp. 259-272.

Yin et al., "Answering Questions with Complex Semantic Constraints on Open Knowledge Bases", In Proceedings of the 24th ACM International on Conference on Information and Knowledge Management, Oct. 2015, pp. 1301-1310.

Yu et al., "Deep Learning for Answer Sentence Selection", In Computer Repository of: arXiv:1412.1632, Dec. 4, 2014, 9 Pages.

Zeiler, Matthew .D. , "Adadelta: An Adaptive Learning Rate Method", In Computer Repository of arxiv: https://arxiv.org/pdf/1212.5701, Dec. 2012, 6 Pages.

Yan, et al., "Assertion-based QA with Question-Aware Open Information Extraction", In Proceeding of theThirty-Second AAAI Conference on Artificial Intelligence, Apr. 26, 2018, 8 Pages.

"International Search Report and Written Opinion Issued in PCT Application No. PCT/US18/064150", dated Mar. 14, 2019, 12 Pages.

* cited by examiner

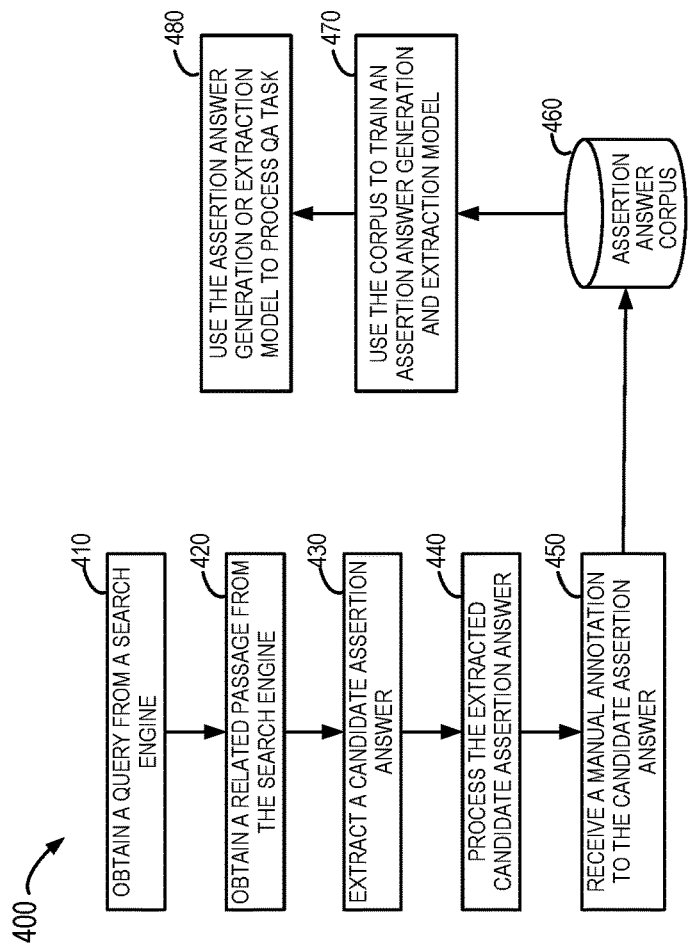

| QUESTION | when will shanghai disney open |
|---|---|
| PASSAGE | the Disney empire's latest outpost, Shanghai Disneyland, will open in late 2015, reports the associated press. |

| No. | CANDIDATE ASSERTION ANSWERS | FLAG |
|---|---|---|
| 1 | <the Disney empire's latest outpost; is; Shanghai Disneyland> | 0 |
| 2 | <the Disney empire's latest outpost; will open; in late 2015> | 0 |
| 3 | <the associated press; reports; the Disney empire's latest outpost will open in late 2015> | 0 |
| 4 | <Shanghai Disneyland; will open; in late 2015> | 1 |

| QUESTION | how much can your bladder hold |
|---|---|
| PASSAGE | A healthy adult bladder can hold up to 16 ounces (2 cups) of urine comfortably, according to the national institutes of health. How frequently it fills depends on how much excess water your body is trying to get rid of. |
| GENERATED RESULT | <a healthy adult bladder; can hold; up to 16 ounces> |
| EXTRACTED RESULT | |

| RANK | FLAG | CANDIDATE ASSERTION ANSWERS |
|---|---|---|
| 1 | 1 | <a healthy adult bladder; can hold; up to 16 ounces; 2 cups of urine> |
| 2 | 0 | <a healthy adult bladder; can hold; up to 16 ounces; according to the national institutes of health> |
| 3 | 0 | <a healthy adult bladder; can hold; up to 16 ounces; comfortably> |
| 4 | 0 | <it; fills; how frequently> |
| 5 | 0 | <your body; is trying; to rid of; how much excess water> |

FIG. 8

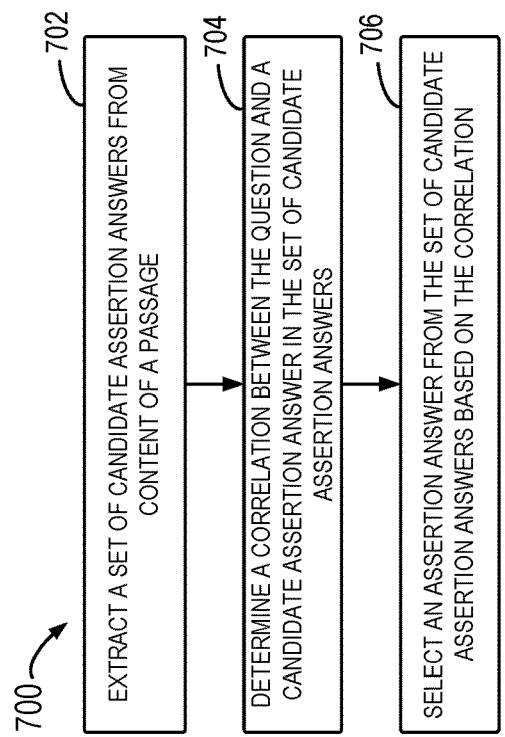

FIG. 7

ASSERTION-BASED QUESTION ANSWERING

CROSS-REFERENCE TO RELATED APPLICATION

This application is a U.S. National Stage Filing under 35 U.S.C. 371 of International Patent Application Serial No. PCT/US18/064150, filed Dec. 6, 2018, and published as WO 2019/118257 on Jun. 20, 2019, which claims priority to Chinese Application No. 201711354191.1, filed Dec. 15, 2017, which applications and publication are incorporated herein by reference in their entirety.

BACKGROUND

Automatic question answering (QA) means that a user raises a question in a natural language manner, and a computing device or server finds a correct answer from various resources according to analysis of the question. For example, an automatic question answering system may include some processes such as question analysis, information retrieval and answer extraction. Generally, the question answering system may pre-collect a lot of information and data, and the information and data are stored in a question-answer pair manner. After the problem raised by the user is received, the question-answer pairs are queried to obtain answer to the question.

Now, main research of question answering concentrates on open domain question answering (Open-OA). The so-called open domain question answering means that types of question answering and sources of answers are not limited. Generally, the open domain question answering is implemented through open information extraction (Open-IE). The open information extraction refers to extracting a relationship tuple having a predetermined structure from any sentence of any text according to relationship phrases and relevant context without requiring a predefined dictionary. Since the structure of the tuple to be extracted may be predefined, the open information extraction may not need any training data. Generally, simple open information extraction does not involve a question, so the question is unknown. However, question answering is based on a question, so the question is known.

SUMMARY

In the embodiments of the present disclosure, there is provided an assertion-based question answering manner. After a question and the related passage are obtained, an assertion answer to the question is determined based on content of the passage, the assertion answer has a predetermined structure and represents a complete semantic meaning. Then, the assertion answer to the question may be output to the user. In embodiments of the present disclosure, the question and the relevant passage are used as input, and a semi-structured assertion answer is output. The assertion answer according to embodiments of the present disclosure can provide richer semantic content than the traditional short answer, and provide a more concise expression than the traditional long answer, thereby ensuring accuracy of the answer while improving the user experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, advantages and aspects of embodiments of the present disclosure will be made more apparent by describing the present disclosure in more detail with reference to drawings. In the drawings, the same or like reference signs represent the same or like elements, wherein.

FIG. 4 illustrates a block diagram of constructing and using an assertion answer corpus according to embodiments of the present disclosure;

FIG. 5 illustrates a diagram of an example data structure in the assertion answer corpus according to embodiments of the present disclosure;

FIG. 7 illustrates a flow chart of a method for extracting assertion answer according to embodiments of the present disclosure;

FIG. 8 illustrates a schematic diagram of a comparison between the generated assertion answer and the extracted assertion answer according to embodiments of the present disclosure.

DETAILED DESCRIPTION

Figure 1:
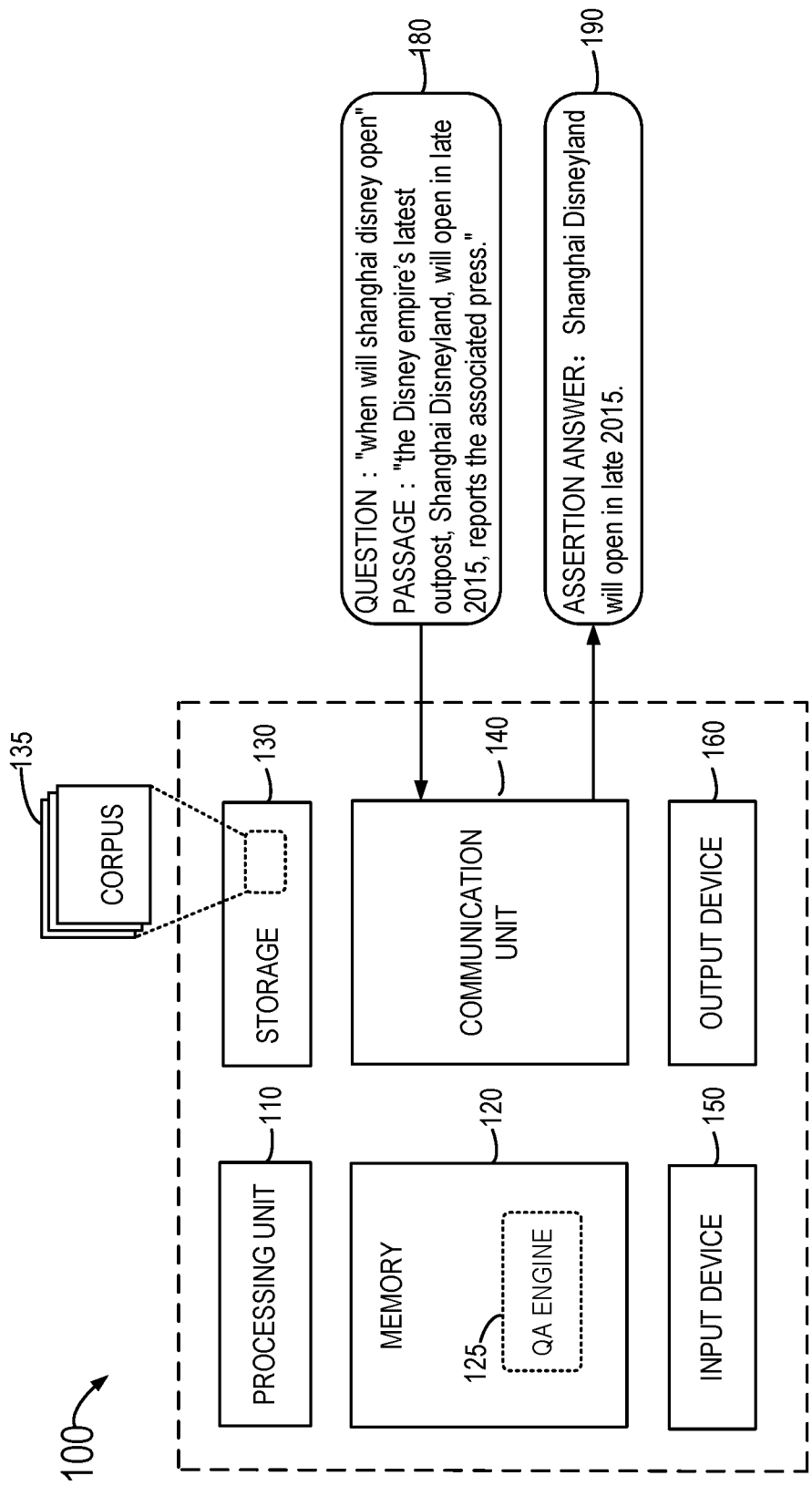
FIG. 1 illustrates a block diagram of a computing device/server in which one or more embodiments of the present disclosure may be implemented.

Embodiments of the present disclosure will be described in more detail below with reference to figures. Although the drawings show some embodiments of the present disclosure, it should be appreciated that the present disclosure may be implemented in many forms and the present disclosure should not be understood as being limited to embodiments illustrated herein. On the contrary, these embodiments are provided herein to enable more thorough and complete understanding of the present disclosure. It should be appreciated that drawing and embodiments of the present disclosure are only used for exemplary purposes and not used to limit the protection scope of the present disclosure.

As used herein, the term "includes" and its variants are to be read as open terms that mean "includes, but is not limited to." The term "based on" is to be read as "based at least in part on." The term "an embodiment" is to be read as "at least one embodiment." The term "another embodiment" is to be read as "at least one other embodiment." The term "some embodiments" is to be read as "at least some embodiments." Definitions of other terms will be given in the text below.

Answers provided by a traditional question answering system usually include two forms. The first form is a long answer (e.g., a paragraph or several sentences), which is longer relevant content obtained through information retrieval. The second form is a short answer (e.g., words or phrase), which is shorter relevant content provided through understanding of the question by the question-answering system. For example, regarding a specific question "who killed JFK", the answer in the first form may be "A ten-month investigation from November 1963 to September 1964 by the Warren Commission concluded that Kennedy was assassinated by Lee Harvey Oswald, acting alone, and that Jack Ruby also acted alone when he killed Oswald before he could stand trial." The answer is longer and the user needs to spend much time in reading. The answer in the second form may be "Lee Harvey Oswald," the answer is too short, only a name, and it cannot convey complete semantic meaning.

As seen from the above, the answers provided by the traditional question-answering system are either too long or too short, a too long answer causes a reading burden to the user (for example, the user might spend much time in reading the answer), while a too short answer might cause the user to not understand (e.g., the user might fail to understand the meaning conveyed by the word or phrase in the answer). Therefore, the user experience provided by the traditional question answering system is not good enough.

To this end, an assertion-based question answering manner is proposed in embodiments of the present disclosure. After obtaining a question and a relevant passage, an assertion answer to the question is determined according to content of the passage, wherein the assertion answer has a predetermined structure and conveys a complete semantic meaning. Still referring to the above-mentioned example question "who killed JFK," an answer provided according to the embodiments of the present disclosure may be "Kennedy was assassinated by Lee Harvey Oswald." This answer has a complete semantic meaning and concise expression, and it may be represented by the predetermined structure <Kennedy; was assassinated; by Lee Harvey Oswald>. Hence, the answer according to embodiments of the present disclosure can provide richer semantic content than the traditional short answer, and provide a more concise expression than the traditional long answer, thereby ensuring accuracy of the answer while improving the user experience. In other words, embodiments of the present disclosure provide the complete and concise answer through deep understanding of the content of the passage.

In addition, according to the embodiments of the present disclosure, the answer and related passage may be obtained from a search engine, so the embodiments of the present disclosure may be used together with the search engine, or used as an additional function of the search engine. In addition, it is possible to use a hierarchical decoder to first generate a structure (such as fields) of an assertion answer, and then generate words in each field, thereby improve readability of the answer. Furthermore, it is also feasible to use a manually-annotated assertion answer corpus to train an answering model to improve the accuracy of the answer. Since the assertion answer according to embodiments of the present disclosure has a complete semantic meaning and a concise expression, it is adapted for a question answering scenario of an audio output device (such as a smart loud-speaker box) supporting a voice control.

Reference is made below to FIG. 1 through FIG. 8 to illustrate basic principles and several example embodiments of the present disclosure herein. FIG. 1 illustrates a block diagram of a computing device/server 100 in which one or more embodiments of the present disclosure may be implemented. It would be appreciated that the computing device/server 100 described in FIG. 1 is merely for illustration but not limit the function and scope of embodiments of the present disclosure in any manners.

As shown in FIG. 1, the computing device/server 100 is in the form of a general-purpose computing device. Components of the computing device/server 100 may include, but are not limited to, one or more processor(s) or processing unit(s) 110, a memory 120, a storage device 130, one or more communication unit(s) 140, one or more input device(s) 150, and one or more output device(s) 160. The processing unit 110 may be a physical or virtual processor and perform various processes based on programs stored in the memory 120. In a multiprocessor system, a plurality of processing units execute computer executable instructions in parallel to improve parallel processing capability of the computing device/server 100.

The computing device/server 100 typically includes various computer storage media. The computer storage media can be any media accessible by the computing device/server 100, including but not limited to volatile and non-volatile media, or removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 can be any removable or non-removable media and may include machine-readable media such as a flash drive, disk, and any other media, which can be used for storing information and/or data (e.g., the assertion answer corpus 135 which is used to train an assertion-based question answering model or engine) and accessed within the computing device/server 100.

The computing device/server 100 may further include additional removable/non-removable or volatile/non-volatile storage media. Although not shown in FIG. 1, a magnetic disk drive is provided for reading and writing from/to a removable and non-volatile disk (e.g., "a floppy disk") and an optical disk drive is provided for reading or writing from/to a removable non-volatile optical disk. In such cases, each drive is connected to the bus (not shown) via one or more data media interfaces. The memory 120 may include an assertion-based question answering (QA) engine 125, which has one or more sets of program module which are configured to perform methods and functions of various embodiments described herein.

The communication unit 140 communicates with another computing device via communication media. Additionally, functions of components in the computing device/server 100 can be implemented in a single computing cluster or a plurality of computing machines that are communicated with each other via communication connections. Therefore, the computing device/server 100 can be operated in a networking environment using a logical connection to one or more other servers, network personal computers (PCs), or another network node.

The input device 150 can include one or more input devices such as a mouse, keyboard, tracking ball and the like. The output device 160 can include one or more output devices such as a display, loudspeaker, printer, and the like. The computing device/server 100 can further communicate, via the communication unit 140, with one or more external devices (not shown) such as a storage device or a display device, one or more devices that enable users to interact with the computing device/server 100, or any devices that enable the computing device/server 100 to communicate with one or more other computing devices (for example, a network card, modem, and the like). Such communication can be performed via input/output (I/O) interfaces (not shown).

As shown in FIG. 1, the computing device/server 100 can receive, through the communication unit 140, an input 180 including the question and the related passage, and enable the QA engine 125 to process the input 180, thereby generating output 190 including the assertion answer. For example, the input 180 may include a question "when will shanghai disney open" and passage "the Disney empire's latest outpost, Shanghai Disneyland, will open in late 2015, reports the associated press", and the output 190 may include an assertion answer "Shanghai Disneyland will open in late 2015", which has a predetermined structure <Shanghai Disneyland; will open; in late 2015>, and conveys a complete semantic meaning, that is, Shanghai Disney will open in 2015.

Those skilled in the art will appreciate that although FIG. 1 shows receiving the input 180 via the communication unit 140 and outputting the output 190, it is also possible to directly obtain the input 180 via the input device 150 and provide the output 190 via the output device 160 directly. In addition, the computing device/server 100 may simultaneously obtain the question and relevant passage, or obtain the question and passage from different sources respectively. Reference is made below to FIGS. 2-8 to specify an example embodiment about how the assertion-based QA engine 125 outputs the assertion answer based on the question and the related passage.

Figure 2:
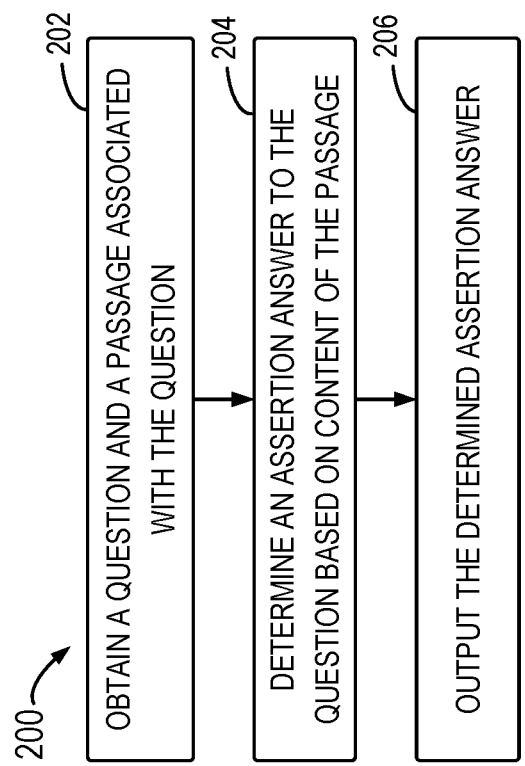
FIG. 2 illustrates a flow chart of a method for assertion-based question answering according to embodiments of the present disclosure.

FIG. 2 illustrates a flow chart of a method for assertion-based question answering according to embodiments of the present disclosure. It should be appreciated that the method 200 may be executed by the computing device/server 100 described with reference to FIG. 1.

At 202, a question (q) and a passage (p) associated with the question are obtained. Optionally, the question may be obtained from a query of the search engine, that is, a question-type query input by the user into the search engine may be regarded as the question, and a search result obtained from the search engine and associated with the query (such as the most relevant search result) or a portion thereof may be regarded as the passage. Alternatively, it is also possible to receive the question from the user directly, and then the QA engine 125 (such as through information retrieval) queries for the passage most relevant to the question. In other words, the QA engine 125 may obtain the passage associated with the question from other programs or modules (such as search engine), or it performs search by itself to obtain the associated passage.

In embodiments of the present disclosure, the term "passage" refers to a paragraph of content having a limited length, and it may be for example a portion of a sentence, a sentence, several sentences, several paragraphs, several webpages and so on. Those skilled in the art should appreciate that the passage described herein is different from a knowledge base of content extracted from massive documents.

At 204, an assertion answer (ast) to the question is determined based on content of the passage, wherein the assertion answer has a predetermined structure and conveys a complete semantic meaning. For example, the QA engine 125 can determine the corresponding assertion answer, according to the inputted question and relevant passage. In embodiments of the present disclosure, the assertion answer is generated with respect to a designated question and a designated passage, and the generated assertion answer can accurately and concisely answer the question. In other words, the assertion answer (ast) can answer the question (q) based on the content of the passage (p).

In the embodiments of the present disclosure, the term "assertion" refers to a statement that something is believed firmly as true. "Assertion answer" refers to an assured answer to the question, it may have a semi-structured predetermined structure (that is, it has predetermined several fields), and can concisely convey a complete semantic meaning (that is, the complete semantic meaning can be understood from the assertion answer without other words or environments).

In some embodiments, the predetermined structure of the assertion answer may include a subject field (sub), a predicate field (pre) and an argument field ($arg_i$). For example, in the above-mentioned example assertion answer <Shanghai Disneyland; will open; in late 2015>, "Shanghai Disneyland" represents a subject, "will open" represents a predicate, and "in late 2015" represents an argument. It should be appreciated that an example predetermined structure subject-predicate-argument is described herein, other predetermined structures capable of conveying complete semantic meaning are also possible.

Figure 6:
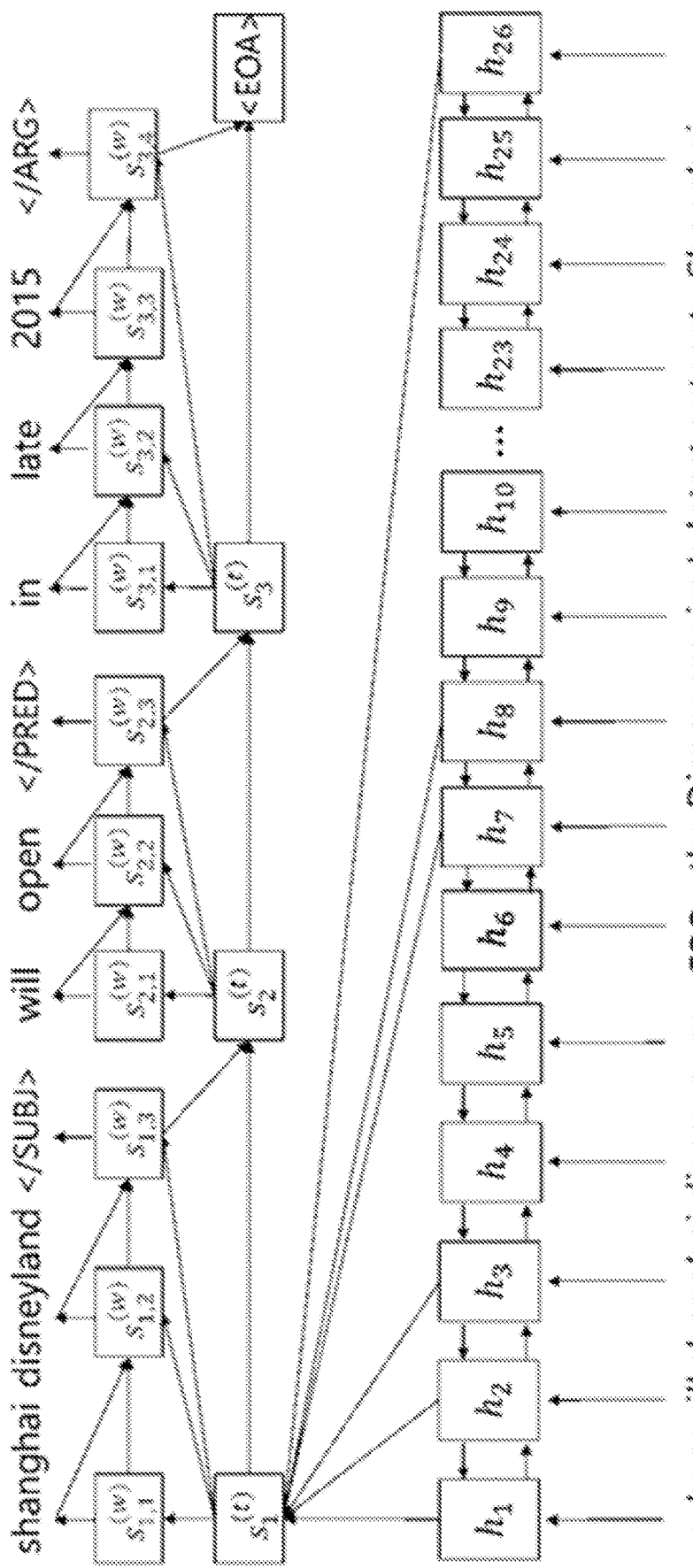
FIG. 6 illustrates a schematic diagram of generating an assertion answer according to embodiments of the present disclosure.

It should be appreciated that determining the assertion answer based on the content of the passage may directly extract an associated sentence from the passage as the assertion answer, or generate the assertion answer based on the content of the passage. Reference is made below to FIG. 6 to describe an example implementation of generating the assertion answer, and reference is made to FIG. 7 to describe an example implementation of extracting the assertion answer.

At 206, the determined assertion answer is output. For example, the QA engine 125 may use a visible or audible device to output the assertion answer. In some embodiments, an audio output device (such as "a smart loudspeaker box") enabling voice control may be used to output the assertion answer, so that the smart loudspeaker box can read concise and complete assertion answer. Since too short answers provided by the traditional smart loudspeaker box cannot convey sufficient information and too long answers need to be read through in a long time period, embodiments of the present disclosure can effectively enhance the user experience as compared with the traditional technologies.

Accordingly, the assertion answer output by embodiments of the method 200 according to the present disclosure can provide richer semantic content than the traditional short answers, and provide more concise expressions than traditional long answers, thereby ensuring the accuracy of answers while improving the user experience.

Figure 3B:
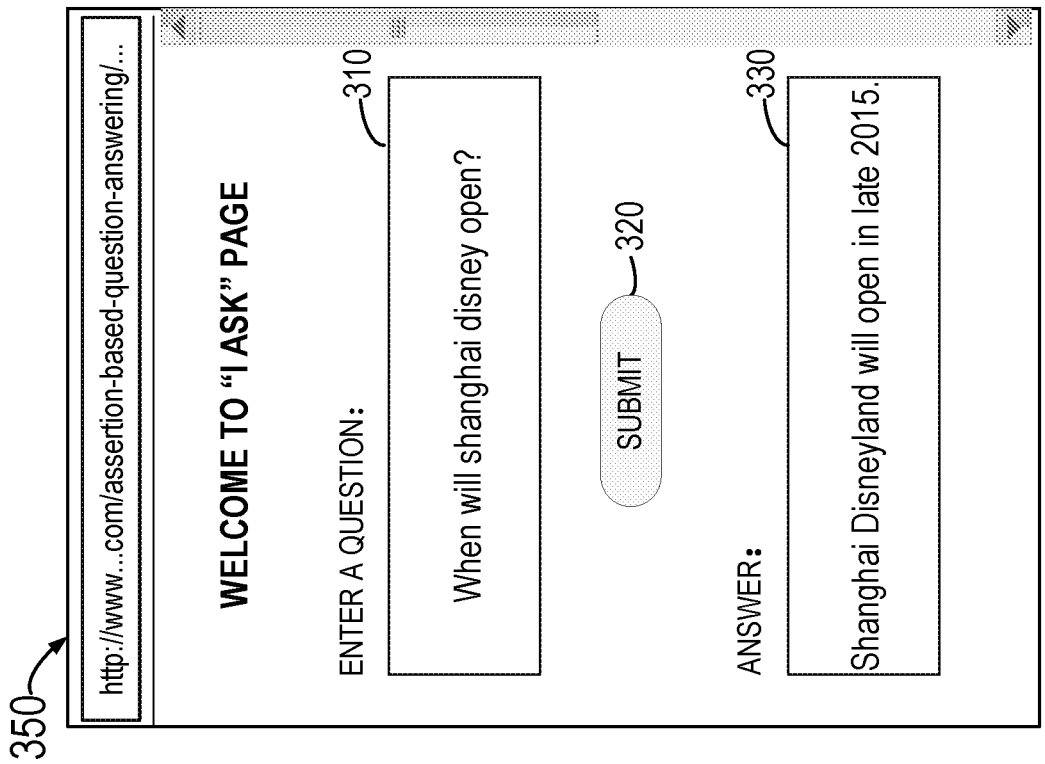
FIGS. 3A-3B illustrate a diagram of a graphic user interface (GUI) for assertion-based question answering according to embodiments of the present disclosure.
Figure 3A:
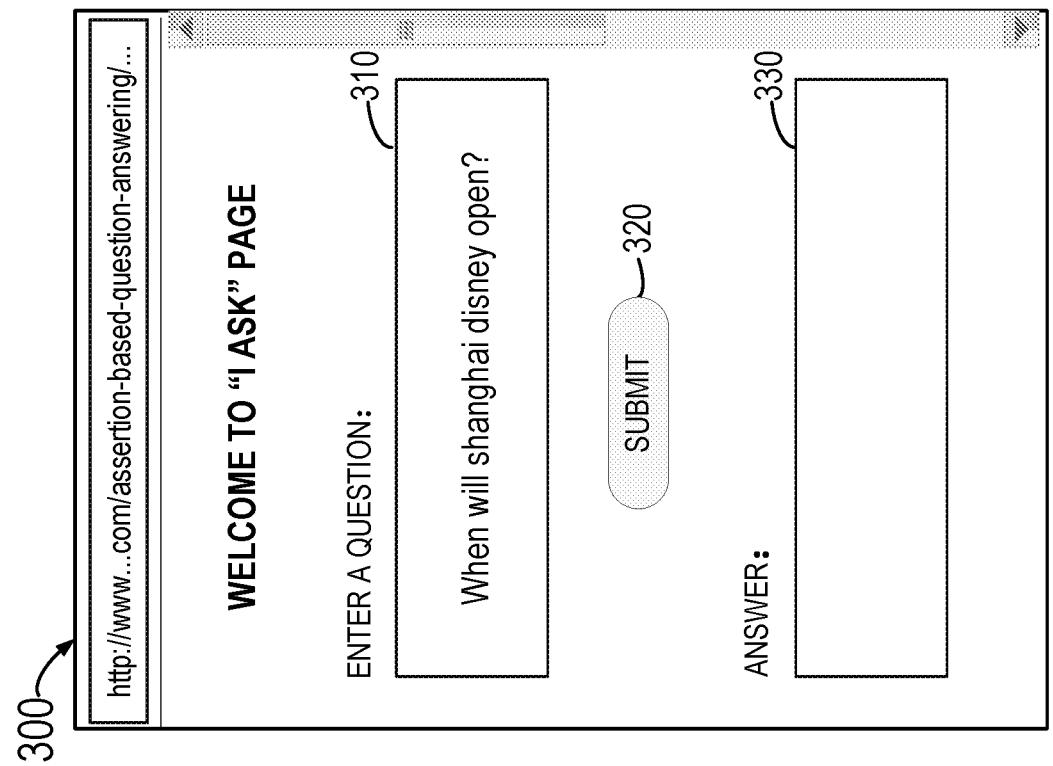

FIGS. 3A-3B illustrate a schematic diagram of graphic user interfaces (GUI) 300 and 350 for assertion-based question answering according to embodiments of the present disclosure. As shown in FIG. 3A, GUI 300 is an online question answering page, which includes a box 310 for inputting a question, a question submitting button 320, a box 330 for outputting an answer, and so on. Further as shown in FIG. 3A, the question "when will shanghai disney open" is already input in box 310. After the user clicks the question submitting button 330, the page skips from the GUI 300 shown in FIG. 3A to the GUI 350 shown in FIG. 3B. As shown in FIG. 3B, the assertion answer "Shanghai Disneyland will open in late 2015" according to embodiments of the present disclosure is output in box 330, it has a predefined structure, and has complete and concise expression, and therefore can effectively answer the user's question.

In some embodiments, a corpus may be constructed and used to train the QA engine 125. FIG. 4 illustrates a block diagram 400 of constructing and using an assertion answer corpus according to embodiments of the present disclosure.

At 410, a query is obtained from a search engine. For example, a question-type query is obtained from a log or online input of the search engine. At 420, a passage is obtained from the search engine, for example, content or part of content in a search result webpage, which is most relevant to the question-type query, may be regarded as the passage. After the query and passage are obtained, a question-passage pair is obtained, for example, a question may correspond to a passage.

At 430, information extraction is used to extract a candidate assertion answer in the question-passage pair, and the assertion answer describes which portion of the passage can answer the question. Any known or further developed open information extraction manner may be applied to embodiments of the present disclosure. In the question-passage pair, there might exist a plurality of candidate assertion answers to a question.

At 440, the extracted candidate assertion answer is processed, for example, the assertion answer is adjusted based on a combination rule to promote understanding of the assertion answer. Then, at 450, the extracted candidate assertion answer may be manually annotated. An annotator may annotate whether the candidate assertion answer can correctly answer the question and simultaneously have a complete semantic meaning, and if yes, the candidate assertion answer is annotated as a positive assertion answer, otherwise, the candidate assertion answer is annotated as a negative assertion answer. After for example hundreds of thousands of assertion answers in tens of thousands of question-passage pairs are annotated, at 460, the assertion answer corpus is generated, which is a corpus generated based on webpage search results, and is also called "WebAssertions".

At 470, it is possible to use the assertion answer corpus "WebAssertions" to train the assertion answer model in the QA engine 125. For example, it is possible to train an assertion answer generation model and an assertion answer extraction model, respectively. Then, at 480, the trained assertion answer generation or extraction model is used to process a question-answer task, thereby improving the accuracy of the assertion answer.

FIG. 5 illustrates a schematic diagram of an example data structure in the assertion answer corpus according to embodiments of the present disclosure. As shown in FIG. 5, regarding a specific question "when will shanghai disney open" and its relevant passage "the Disney empire's latest outpost, Shanghai Disneyland, will open in late 2015, reports the associated press", there exist a plurality of candidate assertion answers, for example, a first candidate assertion answer "<the Disney empire's latest outpost; is; Shanghai Disneyland>", a second candidate assertion answer "<the Disney empire's latest outpost; will open; in late 2015>", a third candidate assertion answer "<the associated press; reports; the Disney empire's latest outpost will open in late 2015>", and a fourth candidate assertion answer "<Shanghai Disneyland; will open; in late 2015>". Through manual annotation, the fourth candidate assertion answer is manually determined as the most suitable assertion answer, so the fourth candidate assertion answer in the corpus is annotated as a positive flag (such as "1"), whereas the first candidate assertion answer, the second candidate assertion answer, the third candidate assertion answer are annotated as a negative flag (such as "0").

In some embodiments, assertion answers of different structures may be combined. For example, <A, is, B> and <A, pre, C> of two structures may be combined into an assertion <B, pre, C>. The fourth candidate assertion answer in FIG. 5 is a combination of the first candidate assertion answer and the second candidate assertion answer.

FIG. 6 illustrates a schematic diagram of generating an assertion answer according to embodiments of the present disclosure. As shown in FIG. 6, the figure shows generating an assertion answer in a sequence-to-assertion (Seq2Ast) manner. The sequence-to-assertion (Seq2Ast) is based on sequence-to-sequence (Seq2Seq) learning, and it includes an encoder and a decoder. The encoder regards the sequence as input, and maps the input to a hidden vector list, and the decoder generates another sequence in a sequential manner of outputting one word one time.

As shown in FIG. 6, it is feasible to connect in series and encode the question "when will shanghai disney open" and the passage "the Disney empire's latest outpost, Shanghai Disneyland, will open in late 2015, reports the associated press" to generate quantization representations $h_1$ to $h_{26}$ (such as vectors) of the question and passage, wherein the question and the passage are separated by a mark <EOQ>, and <EOQ> is encoded as a vector $h_6$.

Then, a tuple-level decoder may be used to decode the quantization representations to first generate a plurality of fields in the assertion answer, vectors of the plurality of fields are $s_1^{(t)}$, $s_2^{(t)}$, $s_3^{(t)}$, and a word-level decoder is used to decode the quantization representations to subsequently generate one or more words in each field. For example, vectors $s_{1,1}^{(w)}$, $s_{1,2}^{(w)}$, $s_{1,3}^{(w)}$ of words in a subject field, vectors $s_{2,1}^{(w)}$, $s_{2,2}^{(w)}$, $s_{2,3}^{(w)}$ of words in a predicate field, and vectors $s_{3,1}^{(w)}$, $s_{3,2}^{(w)}$, $s_{3,3}^{(w)}$, $s_{3,4}^{(w)}$ of words in an argument field. In the Seq2Ast procedure, the tuple-level decoder remembers the structure of the assertion answer, and the word-level decoder learns a dependency relationship in each field. As shown in FIG. 6, the last word in each field is shown as a special mark, for example, </SUBJ> in the subject field, </PRED> in the predicate field, and </ARG> in the argument field. These marks may be omitted when the final assertion answer is generated.

In some embodiments, a Recurrent Neural Network (RNN)-based Gated Recurrent Unit (GRU) may be used as a tuple-level decoder to output a representation of each field in the assertion answer, and another RNN-based GRU may be used as the word-level decoder to generate words in each field. For example, as shown in FIG. 6, the tuple-level decoder may calculate a vector $s_k^{(t)}$ of the $k^{th}$ field according to equation (1), and the word-level decoder may calculate a vector $s_{k,j}^{(w)}$ of the $j^{th}$ word of the $k^{th}$ field according to equation (2):

$$s_k^{(t)} = GRU(s_{k-1}^{(t)}, s_{k-1, J_{k-1}}^{(w)}) \qquad (1)$$

where $s_k^{(t)}$ represents the vector of the $k^{th}$ field, $s_{k-1}^{(t)}$ represents a vector of the k–1$^{th}$ field, and $s_{k-1, J_{k-1}}^{(w)}$ represents a vector of the last word in the k–1$^{th}$ field in the word-level decoder.

$$s_{k,j}^{(w)} = GRU(s_{k,j-1}^{(w)}, [s_k^{(t)}; y_{k,j-1}]) \qquad (2)$$

where $s_{k,j}^{(w)}$ represents a vector of the $j^{th}$ word in the $k^{th}$ field, $s_{k,j-1}^{(w)}$ represents a vector of the j–1th word in the $k^{th}$ field, $s_k^{(t)}$ represents a vector of the $k^{th}$ field, and $y_{k,j-1}$ represents the j–1$^{th}$ word sequence in the $k^{th}$ field.

In other words, according to the embodiments of the present disclosure, a quantization representation of next field of a specific field may be determined based on a quantization representation of the specific field in a plurality of fields and a quantization representation of an ending word in the specific field. A quantization representation of next word of a specific word in the specific field may be determined based on a quantization representation of the specific word in the specific field and the quantization representation of the specific field. Therefore, the assertion answer generation method according to the embodiments of the present disclosure can generate an accurate and suitable answer, and the assertion answer may include words that do not exist in the passage.

FIG. 7 illustrates a flow chart 700 of a method for extracting an assertion answer according to embodiments of the present disclosure. It should be appreciated that the method 700 may be executed by the computing device/server 100 described with reference to FIG. 1, and may be an example implementation of the action 204 described above with reference to FIG. 2.

At 702, a set of candidate assertion answers is extracted from content of a passage. As discussed above, it is possible to perform information extraction for a question-passage pair obtained from the search engine so as to obtain the set of candidate assertion answers. At 704, a correlation between the question and each candidate assertion answer in the set of candidate assertion answers is determined. For example, it is possible to determine a semantic correlation between the question and each candidate assertion answer in the set of candidate assertion answers using one or more of a word-level matching, a phrase-level matching and a sentence-level matching.

In word-level matching, a word-level matching feature $F_{WM}$ may be determined based on the number of words between the question and the candidate assertion answer, wherein the larger the number of the same words is, the more the question is matched with the candidate assertion answer at the word level. In addition, it is further possible to, based on word-word transformation, determine a word-level transformation feature $F_{W2W}$, which is used for processing different word expressions of the same meaning.

In the phrase-level matching, the phrase-level matching features $F_{PP}$ and $F_{P2P}$ may be determined based on phrase-to-phrase transformation, wherein the two are constructed using different Chinese-English pairs or question-answer pairs, to process different phrase expressions of the same meaning.

In sentence-level matching, a sentence-level matching degree between the question and candidate assertion answer may be calculated with a CNN-based feature $f_{CNN}$. For example, feature $f_{CNN}$ may be calculated through Equation (3):

$$f_{CNN}(que, ast) = \cosine(cdssm_1(q), cdssm_2(ast)) \quad (3)$$

where $f_{CNN}$(que, ast) denotes the CNN-based feature between the question and the candidate assertion answer, and $cdssm_1$(q) and $cdssm_2$(ast) denote a question vector and a candidate assertion answer vector obtained respectively through two CNNs.

In addition, the sentence-level matching degree between the question and the candidate assertion answer may be calculated by using a RNN-based feature $f_{RNN}$. Two DNNs may be used to map the question and the candidate assertion answer respectively to vectors with a fixed length, and the same bidirectional GRU may be used to obtain the question vector and the candidate assertion answer vector in two directions.

It is possible to use question-answer pairs having random fall to train model parameters of $f_{CNN}$ and $f_{RNN}$. For example, paired boundary ranking loss for each training example may be calculated through Equation (4):

$$\mathcal{L} = \max(0, m - f^+(q, ast) + f^-(q, ast)) \quad (4)$$

where $f^+$(q ast) and $f^-$(q, ast) are model scores for a correlation pair and an non-correlation pair, and m refers to a boundary.

At 706, an assertion answer is selected from the set of candidate assertion answers based on the correlation, for example, the candidate assertion answer ranking topmost may be selected as a formal assertion answer. In some embodiments, a decision tree forest may be constructed, and a linear combination of decision tree results may be output. Each branch in the decision tree indicates a threshold applied to a single feature, and each leaf node is a real value. For N trees, the correlation score of the question-assertion answer pair may be calculated through Equation (5):

$$s(q, ast) = \sum_{i=1}^{N} w_i tr_i(q, ast) \quad (5)$$

Where $w_i$ is a weight associated with the $i^{th}$ recurrent tree, $tr_i(\cdot)$ is a value of a leaf node obtained by evaluating the $i^{th}$ tree having a feature $[f_1(q, ast), \ldots, f_K(q, ast)]$, and a value of $w_i$ and a parameter in $tr_i(\cdot)$ are learned by using gradient descent during training.

FIG. 8 illustrates a schematic diagram of a comparison between the generated assertion answer and the extracted assertion answer according to embodiments of the present disclosure. As shown in FIG. 8, regarding the question "how much can your bladder hold" and a relevant passage "A healthy adult bladder can hold up to 16 ounces (2 cups) of urine comfortably, according to the national institutes of health. How frequently it fills depends on how much excess water your body is trying to get rid of", an example of a result generated by the generation method according to embodiments of the present disclosure is "a healthy adult bladder can hold up to 16 ounces", while an example of a result extracted by the extraction method according to the embodiments of the present disclosure is "<a healthy adult bladder can hold up to 16 ounces, 2 cups of urine>". It can be seen that either the assertion answer generation method or the assertion answer extraction method can provide a concise answer having a fixed structure and a complete semantic meaning.

Further referring to FIG. 8, the assertion answer generation method can generate the structure of the assertion answer, smooth expression of each field, and complete semantic to a certain degree. In addition, in the example of FIG. 8, the result of the assertion answer generation method is more concise than the result of the assertion answer extraction method.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single implementation. Conversely, various features that are described in the context of a single implementation may also be implemented in multiple embodiments separately or in any suitable sub-combination.

Some example embodiments of the present disclosure are listed below.

In one aspect, there is provided a computer-implemented method. The method comprises: obtaining a question and a passage associated with the question; determining an assertion answer to the question based on content of the passage, the assertion answer has a predetermined structure and conveys a complete semantic meaning; and outputting the determined assertion answer.

In some embodiments, the predetermined structure includes a subject field, a predicate field and an argument field, and wherein the obtaining a question and a passage associated with the question comprises: obtaining the question from a query of a search engine; and obtaining the passage based on a search result associated with the query in the search engine.

In some embodiments, the determining an assertion answer to the question based on content of the passage comprises: generating the assertion answer having the predetermined structure based on content of the passage.

In some embodiments, the generating the assertion answer having the predetermined structure comprises: generating quantization representations of the question and the passage by encoding the question and the passage; generating a plurality of fields in the assertion answer by decoding the quantization representations; and generating a plurality of words in the plurality of fields by decoding the quantization representations.

In some embodiments, the generating a plurality of fields in the assertion answer comprises: determining a quantization representation of next field of a specific field in the plurality of fields based on a quantization representation of the specific field and a quantization representation of an ending word in the specific field; and wherein the generating a plurality of words in a plurality of fields comprises: determining a quantization representation of next word of a specific word in the specific field based on a quantization representation of the specific word in the specific field and the quantization representation of the specific field.

In some embodiments, the determining an assertion answer to the question based on the content of the passage comprises: extracting the assertion answer having the predetermined structure from content of the passage.

In some embodiments, the extracting the assertion answer comprises: extracting a set of candidate assertion answers from the content of the passage; determining a correlation between the question and a candidate assertion answer in the set of candidate assertion answers using at least one of a word-level matching, a phrase-level matching, and a sentence-level matching; and selecting the assertion answer from the set of candidate assertion answers based on the correlation.

In some embodiments, the method is performed by an assertion-based question answering model, the assertion-based question-answer model is trained using a corpus constructed by: obtaining a question-passage pair from the search engine, extracting a candidate assertion answer, and receiving a manual annotation for the candidate assertion answer.

In some embodiments, the outputting the determined assertion answer comprises: outputting the assertion answer using an audio output device enabling a voice control.

In another aspect, there is provided an electronic device. The electronic device comprises: a processing unit; and a memory coupled to the processing unit and storing instructions thereon, the instructions, when executed by the processing unit, performing acts including: obtaining a question and a passage associated with the question; determining an assertion answer to the question based on the content of the passage, the assertion answer has a predetermined structure and conveys a complete semantic meaning; and outputting the determined assertion answer.

In some embodiments, the predetermined structure comprises a subject field, a predicate field and an argument field, and wherein the obtaining a question and a passage associated with the question comprises: obtaining the question from a query of a search engine; and obtaining the passage based on a search result associated with the query in the search engine.

In some embodiments, the determining an assertion answer to the question based on content of the passage comprises: generating the assertion answer having the predetermined structure based on content of the passage.

In some embodiments, the generating an assertion answer having a predetermined structure comprises: generating quantization representations of the question and the passage by encoding the question and the passage; generating a plurality of fields in the assertion answer by decoding the quantization representations; and generating a plurality of words in the plurality of fields by decoding the quantization representations.

In some embodiments, the generating a plurality of fields in the assertion answer comprises: determining a quantization representation of next field of a specific field in the plurality of fields based on a quantization representation of the specific field and a quantization representation of an ending word in the specific field; and wherein the generating a plurality of words in a plurality of fields comprises: determining a quantization representation of next word of a specific word in the specific field based on a quantization representation of the specific word in the specific field and the quantization representation of the specific field.

In some embodiments, the determining an assertion answer to the question based on the content of the passage comprises: extracting the assertion answer having the predetermined structure from content of the passage.

In some embodiments, the extracting the assertion answer comprises: extracting a set of candidate assertion answers from the content of the passage; determining a correlation between the question and a candidate assertion answer in the set of candidate assertion answers using at least one of a word-level matching, a phrase-level matching, and a sentence-level matching; and selecting the assertion answer from the set of candidate assertion answers based on the correlation.

In some embodiments, the acts are performed by an assertion-based question answering model running on the processing unit, and the assertion-based question-answer model is trained using a corpus constructed below: obtaining a question-passage pair from the search engine, extracting a candidate assertion answer, and receiving manual annotation for the candidate assertion answer.

In some embodiments, outputting the determined assertion answer comprises: outputting the assertion answer using an audio output device enabling voice control.

In a further aspect, there is provided a computer program product. The computer program product is stored in a non-transitory computer storage medium and comprises machine-executable instructions which, when run on a device, cause the device to perform acts: obtaining a question and a passage associated with the question; determining an assertion answer to the question based on the content of the passage, the assertion answer has a predetermined structure and conveys complete semantic meaning; and outputting the determined assertion answer.

In some embodiments, the predetermined structure comprises a subject field, a predicate field and an argument field, and wherein the obtaining a question and a passage associated with the question comprises: obtaining the question from a query of a search engine; and obtaining the passage based on a search result associated with the query in the search engine.

In some embodiments, the determining an assertion answer to the question based on the content of the passage comprises: generating the assertion answer having the predetermined structure based on content of the passage.

In some embodiments, the generating an assertion answer having the predetermined structure comprises: generating quantization representations of the question and the passage by encoding the question and the passage; generating a plurality of fields in the assertion answer by decoding the quantization representations; and generating a plurality of words in the plurality of fields by decoding the quantization representations.

In some embodiments, the generating a plurality of fields in the assertion answer comprises: determining a quantization representation of next field of a specific field in the plurality of fields based on a quantization representation of the specific field and a quantization representation of an ending word in the specific field; and wherein the generating a plurality of words in the plurality of fields comprises: determining a quantization representation of next word of a specific word in the specific field based on a quantization representation of the specific word in the specific field and the quantization representation of the specific field.

In some embodiments, the determining an assertion answer to the question based on the content of the passage comprises: extracting the assertion answer having the predetermined structure from content of the passage.

In some embodiments, the extracting the assertion answer comprises: extracting a set of candidate assertion answers from the content of the passage; determining a correlation between the question and the candidate assertion answers in the set of candidate assertion answers using at least one of a word-level matching, a phrase-level matching, and a sentence-level matching; and selecting an assertion answer from the set of candidate assertion answers based on the correlation.

In some embodiments, the acts are performed by an assertion-based question answering model running on the device, and the assertion-based question-answer model is trained using a corpus constructed by obtaining a question-passage pair from the search engine, extracting a candidate assertion answer, and receiving a manual annotation for the candidate assertion answer.

In some embodiments, outputting the determined assertion answer comprises: outputting the assertion answer using an audio output device enabling voice control.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
obtaining a question and a passage associated with the question via an input device of a computing device;
generating an assertion answer having a predetermined structure based on content of the passage by:
generating quantization representations of the question and the passage by encoding the question and the passage;
generating a pluralit of fields in the assertion answer by decoding the quantization representations; and
generating a plurality of words in the plurality of fields by decoding the quantization representations;
determining the assertion answer to the question based on the content of the passage, the assertion answer conveying a complete semantic meaning; and
outputting the determined assertion answer.

2. The method according to claim 1, wherein the predetermined structure includes a subject field, a predicate field and an argument field, and wherein the obtaining a question and a passage associated with the question comprises:
obtaining the question from a query of a search engine; and
obtaining the passage based on a search result associated with the query in the search engine.

3. The method according to claim 1, wherein the determining an assertion answer to the question based on content of the passage comprises:
generating the assertion answer having the predetermined structure based on the content of the passage.

4. The method according to claim 1, wherein the generating a plurality of fields in the assertion answer comprises:
determining, based on a quantization representation of a specific field in the plurality of fields and a quantization representation of an ending word in the specific field, a quantization representation of next field of the specific field;

and wherein the generating a plurality of words in the plurality of fields comprises:

determining, based on a quantization representation of a specific word in the specific field and the quantization representation of the specific field, a quantization representation of next word of the specific word in the specific field.

5. The method according to claim 1, wherein the determining an assertion answer to the question based on content of the passage comprises:

extracting the assertion answer having the predetermined structure from the content of the passage.

6. The method according to claim 5, wherein the extracting the assertion answer comprises:

extracting a set of candidate assertion answers from the content of the passage;

determining a correlation between the question and a candidate assertion answer in the set of candidate assertion answers using at least one of a word-level matching, a phrase-level matching and a sentence-level matching; and selecting the assertion answer from the set of candidate assertion answers based on the correlation.

7. The method according to claim 1, wherein the method is performed by an assertion-based question answering model, the assertion-based question answering model is trained using a corpus constructed by: obtaining a question-passage pair from a search engine, extracting a candidate assertion answer, and receiving a manual annotation for the candidate assertion answer.

8. The method according to claim 1, wherein the outputting the determined assertion answer comprises:

outputting the assertion answer using an audio output device enabling a voice control.

9. An electronic device, comprising:

a processing unit;

a memory coupled to the processing unit and storing instructions thereon, the instructions, when executed by the processing unit, performing acts of:

obtaining a question and a passage associated with the question via an input device of the electronic device:

generating an assertion answer having a predetermined structure based on content of the passage by:

generating quantization representations of the question and the passage by encoding the question and the passage;

generating a plurality of fields in the assertion answer by decoding the quantization representations; and generating a plurality of words in the plurality of fields by decoding the quantization representations determining the assertion answer to the question based on the content of the passage, the assertion answer conveying a complete semantic meaning; and outputting the determined assertion answer.

10. The electronic device according to claim 9, wherein the determining an assertion answer to the question based on content of the passage comprises:

generating the assertion answer having the predetermined structure based on the content of the passage.

11. The electronic device according to claim 9, wherein the determining an assertion answer to the question based on content of the passage comprises:

extracting the assertion answer having the predetermined structure from the content of the passage.

12. The electronic device according to claim 11, wherein the extracting the assertion answer comprises:

extracting a set of candidate assertion answers from the content of the passagel determining a correlation between the question and a candidate assertion answer in the set of candidate assertion answers using at least one of a word-level matching, a phrase-level matching and a sentence-level matching; and selecting the assertion answer from the set of candidate assertion answers based on the correlation.

13. A computer program product stored in a computer storage medium and comprises machine-executable instructions which, when run on a device, cause the device to:

obtain a question and a passage associated with the question;

generate an assertion answer having a predetermined structure based on content of the passage by:

generating quantization representations of the question and the passage by encoding the question and the passa e;

generating a plurality of fields in the assertion answer by decoding the quantization representations; and generating a plurality of words in the plurality of fields by decoding the quantization representations;

determine the assertion answer to the question based on the content of the passage, the assertion answer conveying a complete semantic meaning; and output the determined assertion answer.

* * * * *